(12) United States Patent
Osakabe (10) Patent No.: US 8,223,406 B2
(45) Date of Patent: Jul. 17, 2012

(54) IMAGE READING APPARATUS

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 208 days.

(21) Appl. No.: 12/748,207

(22) Filed: Mar. 26, 2010

(65) Prior Publication Data

US 2010/0245950 A1  Sep. 30, 2010

(30) Foreign Application Priority Data

Mar. 31, 2009  (JP) ................. 2009-086673

(51) Int. Cl.
*H04N 1/04* (2006.01)

(52) U.S. Cl. ......... 358/474; 358/496; 358/497; 358/408

(58) Field of Classification Search ............. 358/496, 358/497, 498, 474, 471, 401, 505, 501; 399/379, 399/380, 367

See application file for complete search history.

(56) References Cited

U.S. PATENT DOCUMENTS

| | | | | |
|---|---|---|---|---|
| 5,610,731 | A | * | 3/1997 | Itoh ............. 358/496 |
| 6,055,070 | A | * | 4/2000 | Kang ............. 358/497 |
| 7,589,871 | B2 | * | 9/2009 | Yoshimoto et al. ..... 358/496 |
| 7,755,810 | B2 | * | 7/2010 | Kuse ............. 358/474 |
| 2007/0268529 | A1 | | 11/2007 | Kuse |
| 2010/0245949 | A1 | * | 9/2010 | Nakakita et al. ........ 358/498 |

FOREIGN PATENT DOCUMENTS

| | | |
|---|---|---|
| JP | H08-228266 A | 9/1996 |
| JP | H10-186535 A | 7/1998 |
| JP | H11-069106 A | 3/1999 |
| JP | 2000-134409 A | 5/2000 |
| JP | 2000-351482 A | 12/2000 |
| JP | 2003-046721 A | 2/2003 |
| JP | 2003-110808 A | 4/2003 |
| JP | 2004-210450 A | 7/2004 |
| JP | 2004-349911 A | 12/2004 |
| JP | 2005-123704 A | 5/2005 |

OTHER PUBLICATIONS

Japan Patent Office, Notice of Reasons for Rejection for Japanese Patent Application No. 2009-086673 (counterpart to above-captioned patent application), mailed Mar. 2, 2011.

* cited by examiner

*Primary Examiner* — Cheukfan Lee
(74) *Attorney, Agent, or Firm* — Baker Botts L.L.P.

(57) ABSTRACT

An image reading apparatus includes an image reading portion that moves in a predetermined direction. The image reading portion includes an image reading sensor that reads an image on a sheet. The image reading apparatus also includes a sheet feeder that feeds the sheet, a first transparent member with a reference surface that supports the sheet thereon, and a second transparent member that contacts the sheet fed by the sheet feeder. The second transparent member is positioned in an inclined position with respect to the reference surface of the first transparent member. The image reading portion moves along a lower surface of the first transparent member and a lower surface of the second transparent member.

14 Claims, 10 Drawing Sheets

IMAGE READING APPARATUS

CROSS REFERENCE TO RELATED APPLICATION

The present application claims priority from Japanese Patent Application No. 2009-086673, which was filed on Mar. 31, 2009, the disclosure of which is incorporated herein by reference in its entirety.

BACKGROUND OF THE INVENTION

1. Field of the Invention

The present invention relates to an image reading apparatus capable of reading an image of a fixed (stationary) sheet and reading an image of a conveying sheet at a reading position.

2. Description of the Related Art

Conventionally, image reading apparatuses that can, not only read an image of a fixed (stationary) sheet on a transparent glass plate, but also read an image of a conveying sheet, are known. In such an image reading apparatus, a first transparent member for placing the fixed (stationary) sheet and a second transparent member for contacting the conveying sheet are disposed in the same straight line, and a contact image sensor (CIS) mounted on a carriage reads the image of the sheet while moving in contact with lower surfaces of the transparent members.

SUMMARY OF THE INVENTION

In such an image reading apparatus, since the first transparent member and the second transparent member are disposed in the same straight line, a conveying path need to be designed in accordance with the second transparent member.

A need has arisen to provide an image reading apparatus that has a higher degree of freedom for designing the conveying path, while the CIS is in contact with the lower surfaces of the first transparent member and the second transparent member.

According to an embodiment of the present invention, an image reading apparatus comprises an image reading portion configured to move in a predetermined direction, the image reading portion comprising an image reading sensor configured to read an image on a sheet. The image reading apparatus further comprises a sheet feeder configured to feed the sheet, a first transparent member having a reference surface configured to support the sheet thereon, and a second transparent member configured to contact the sheet fed by the sheet feeder, wherein the second transparent member is positioned in an inclined position with respect to the reference surface of the first transparent member, wherein the image reading portion is configured to move along a lower surface of the first transparent member and to move along a lower surface of the second transparent member.

Other objects, features, and advantages of embodiments of the present invention will be apparent to persons of ordinary skill in the art from the following description of preferred embodiments with reference to the accompanying drawings.

BRIEF DESCRIPTION OF THE DRAWINGS

FIG. 7 is an enlarged sectional view of the main portion according to a third embodiment of the present invention, with FIG. 7A being a side view of a state in which an image reading sensor is positioned at a side of a first transparent member.

DESCRIPTION OF THE PREFERRED EMBODIMENTS

Embodiments for carrying out the present invention will hereunder be described with reference to the drawings.

The embodiments of the present invention is applied to an image reading apparatus 2 in a multi-function apparatus having a facsimile function, a scanner function, a copying function and a printer function.

[Basic Structure of Multi-Function Apparatus]

Figure 1:
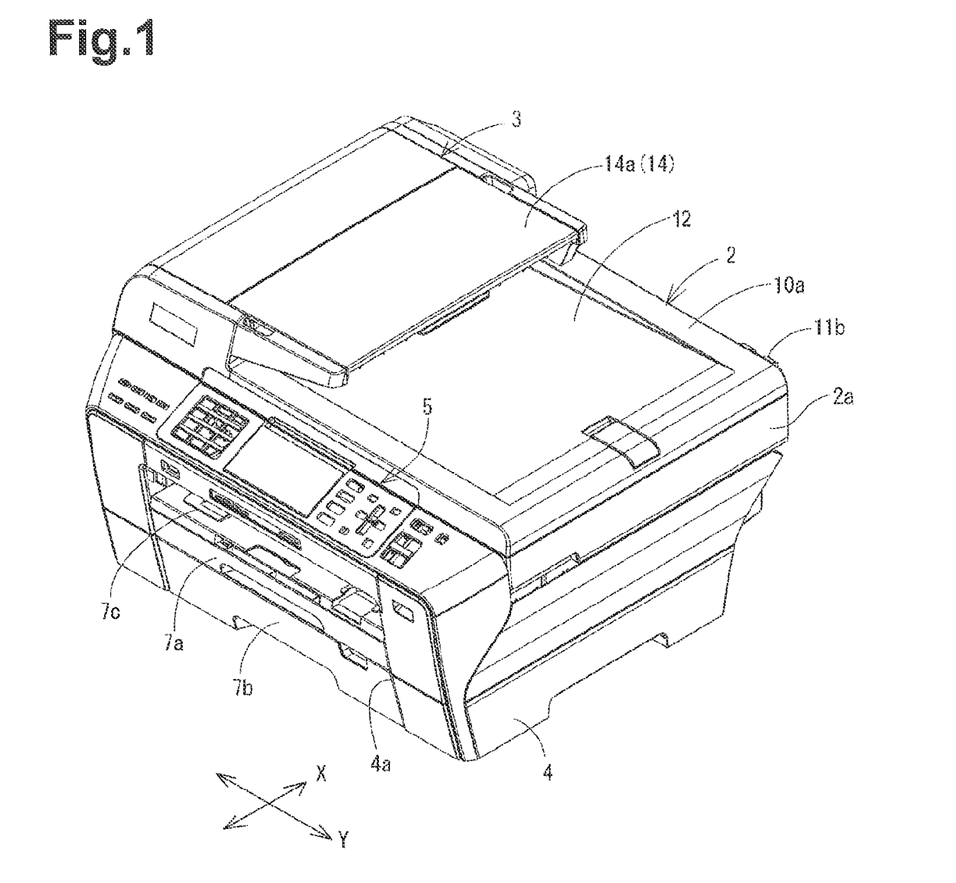
FIG. 1 is a perspective view of a multi-function apparatus including an automatic document feeder and an image reading apparatus according to the present invention.
Figure 2:
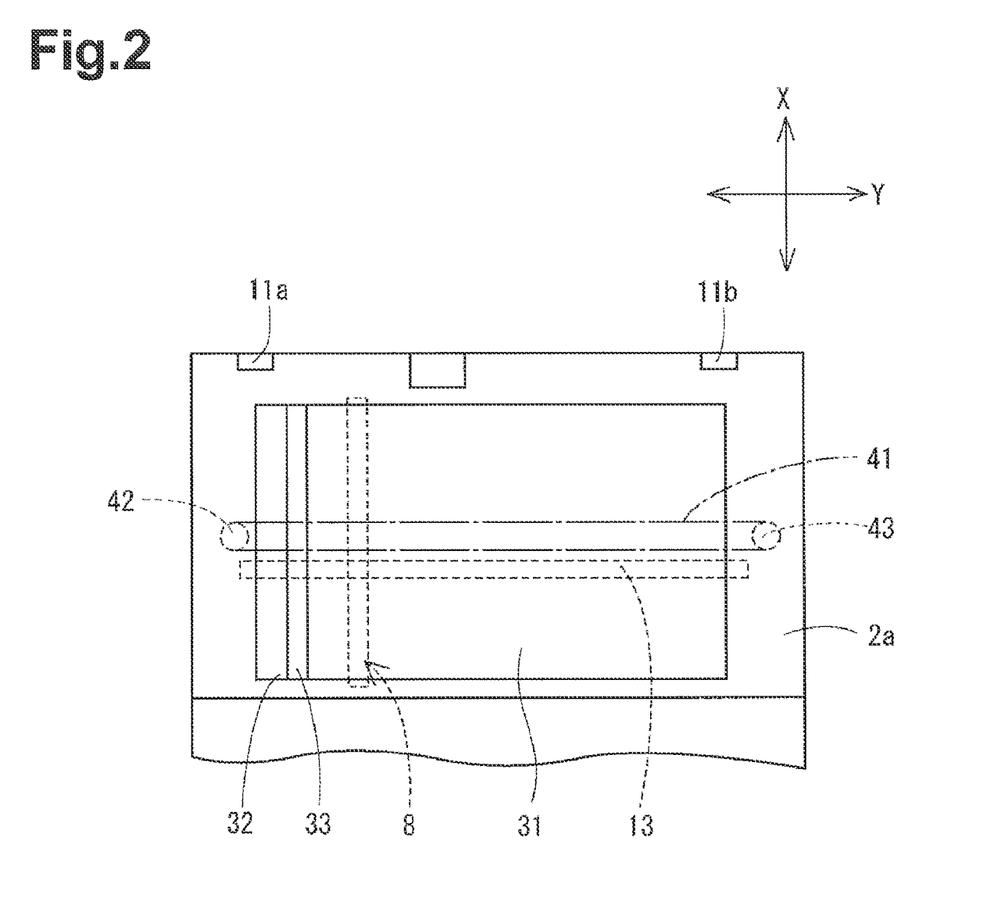
FIG. 2 is a schematic plan view of a conveyance reading section and a fixation reading section.

As shown in FIGS. 1 and 2, an operation panel section 5 is disposed towards the forward portion of the upper surface of a housing 4 of the multi-function apparatus 1. The operation panel section 5 includes, for example, a numeric keypad for executing the facsimile function, the scanner function, or the copying function, button keys for giving instructions for performing various operations, and a liquid crystal panel for performing, for example, an instruction content display or an error display.

As shown in FIG. 1, an opening 4a is formed in the front side (near side in FIG. 1) of the housing 4 of the multi-function apparatus 1. Sheet-feed cassettes 7a and 7b are mounted to the opening 4a at two vertical heights along an X-axis direction so that they can be inserted into and removed from the opening 4a. The sheet-feed cassettes 7a and 7b have an open top and hold sheets in a stacked state. A sheet-discharge tray 7c is mounted to the upper side of the upper sheet-feed cassette 7a. The sheets that are selectively fed from the sheet-feed cassettes 7a and 7b are conveyed to an image recording section (not shown), such as an ink jet type, provided in the housing 4, after which the sheets are discharged to the sheet-discharge tray 7c.

[Image Reading Apparatus and Automatic Document Feeder]

Figure 3:
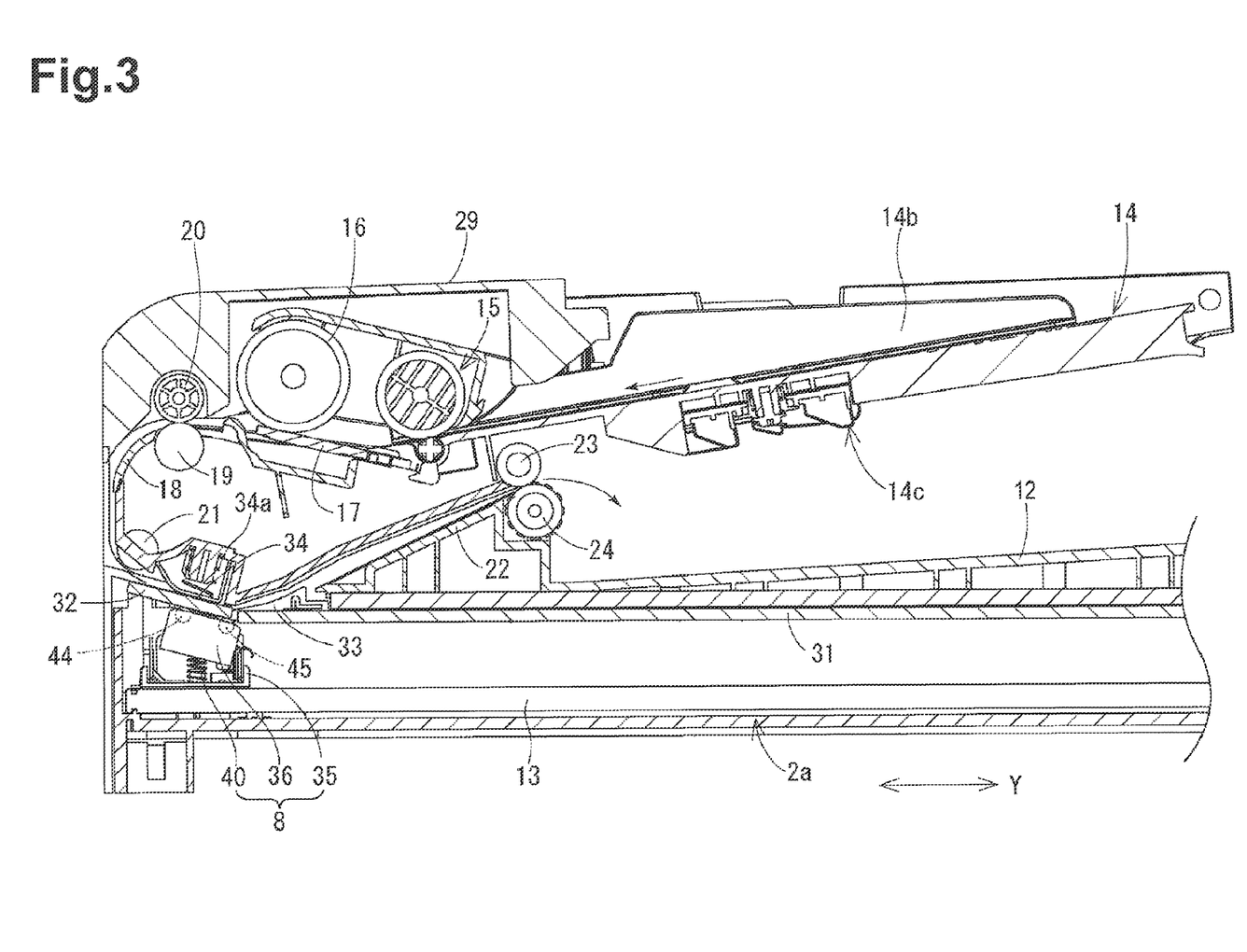
FIG. 3 is a side sectional view of an automatic document feeder and an image reading apparatus according to a first embodiment of the present invention.
Figure 4:
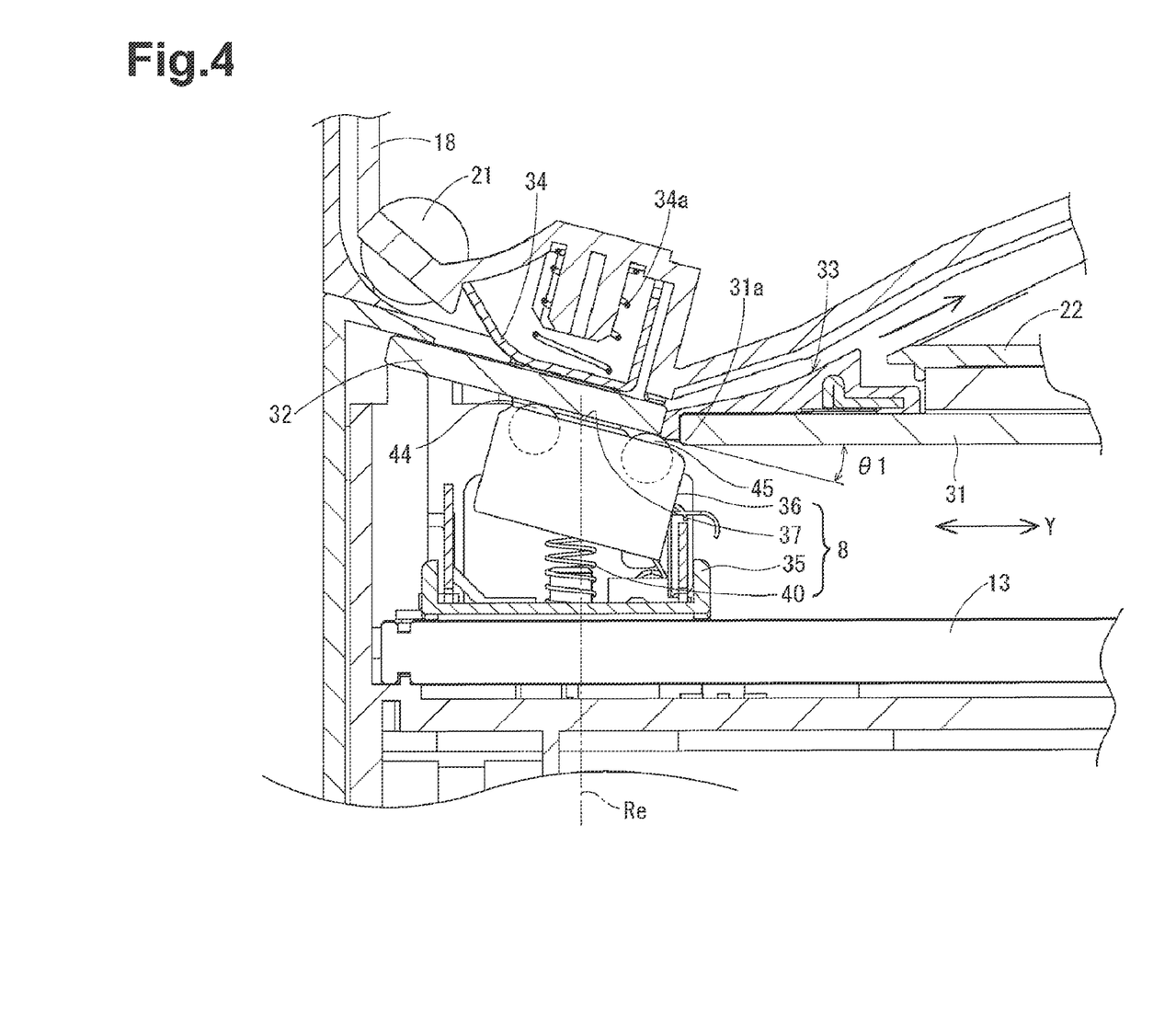
FIG. 4 is an enlarged sectional view of the main portion according to the first embodiment.

The image reading apparatus 2 for executing the scanner function and an automatic document feeder 3 (an example of a "sheet feeder" according to the present invention) mounted thereto are disposed behind the operation panel section 5. As shown in FIGS. 3 and 4 and as described in detail below, at the upper side of a body case 2a of the image reading apparatus 2, a first transparent member 31 (an example of a "first transparent member" according to the present invention) and a second transparent member 32 (an example of a "second transparent member" according to the present invention) are disposed adjacent to each other through a take-up guide member 33. The first transparent member 31 is provided for placing thereon originals at a fixation reading section. The second transparent member 32 is provided for allowing the originals to slidably contact therewith at a conveyance reading section.

The body case 2a of the image reading apparatus 2 is mounted so that one end portion thereof (in the embodiment, the rear side that is separated from a panel cover 5) can rotate vertically around a pivot (not shown) provided horizontally with respect to the housing 4.

The automatic document feeder (ADF) 3 that feeds originals to the image reading apparatus 2 includes an upper cover member 10 that substantially covers the upper side of the body case 2a, the sheet-discharge tray section 12 formed at the upper surface of the upper cover member 10, and a sheet-feed tray section 14 disposed above the sheet-discharge tray 12. A cover member 14a is provided at the sheet-feed tray section 14 so that it can be folded. FIG. 1 shows a state in which the cover member 14a is folded at the sheet-feed tray section 14. When a large original is placed on the sheet-feed tray section 14, the back portion of the original is placed at the back side of the spread cover member 14a. A pressing plate 10a is mounted to the lower surface of the upper cover member 10 (see FIGS. 1 and 3). The pressing plate 10a presses a fixed original whose image recording surface is brought into contact with and is placed on the first transparent member 31. Therefore, the first transparent member 31 corresponds to the fixation reading section.

The upper cover member 10 formed of synthetic resin is mounted to the body case 2a through a pair of hinge means 11a and 11b (see FIG. 2), provided at the back end (the side opposite to the operation panel section 5) of the upper cover member 10, so as to be movable vertically with respect to the body case 2a and so as to be rotatable with respect to the body case 2a so as to be openable and closable. The reason that the pair of hinge means 11a and 11b are movable vertically is that a thick original, such as a book, placed on the first transparent member 31, can be held down by the upper cover member 10 in parallel with the surface of the first transparent member 31.

The automatic document feeder 3 includes a reverse conveying path member 18, which is a substantially U-turn path member, extending in a first conveying direction and a second conveying direction. The first conveying direction is a direction in which an original is conveyed to a reading position Re situated at one side in a Y direction of the sheet-feed tray section 14. The second conveying direction is a direction in which an original is conveyed from the reading position Re to the sheet-discharge tray section 12.

A pair of original guides 14b are provided at the sheet-feed tray section 14. They are formed so that, if one of the original guides 14b is manually moved by a well-known interlocking mechanism 14c, the other original guide 14b is simultaneously moved in an X direction, to make it possible to adjust the wideness in accordance with the width of the original in the X direction.

The automatic document feeder 3 includes a taken-in section, a separation section, and the reverse conveying path member 18. The take-in section takes in a plurality of originals placed in a stacked state on the sheet-feed tray section 14. The separation section separates the originals from the take-in section one at a time to convey the separated originals in the first conveying direction (that is, in the direction in which the sheets approach the reading position Re). The reverse conveying path member 18 reverses the direction of the conveyed sheets in the second conveying direction from the reading position Re and conveys the sheets whose direction has been reversed to the sheet-discharge tray section 12. The take-in section is a pair of take-in rollers 15. A separation roller 16 and a separation pad 17 are disposed downstream from the take-in section in the conveying direction. As shown in FIG. 3, these components are disposed below a cover member 29 that covers the upper side of the left end portion of the automatic document feeder 3.

A feed-in roller section including a first driving roller 19 and a first pinch roller 20 is disposed at the upper end portion of the reverse conveying path member 18 and downstream from the separation section. A second driving roller 21 is disposed at the lower end portion of the reverse conveying path member 18 and upstream from the reading position Re. Further, a discharge roller section including a third driving roller 23 and a third pinch roller 24 is disposed at the upper end (downstream side end) of an upwardly inclined discharge path member 22 and is situated downstream from the reading position Re. Rotational power from one ADF motor (not shown) is transmitted to the take-in rollers 15, the separation roller 16, and the first to third driving rollers 21 to 23 through a gear mechanism (not shown).

[Structure of Image Reading Means]

Linear original reading means 8 (an example of an "image reading portion" according to the present invention) for reading an image recording surface of an original is placed on the linear guide member 13 extending along the Y-axis direction in FIGS. 1 and 2 so that the linear original reading means 8 can reciprocate. The original reading means 8 is linearly formed long in the X-axis direction in FIG. 1.

As shown in FIGS. 2 and 3, the second transparent member 32 whose left area is formed at the left end portion of the first transparent member 31, with the take-up guide member 33 that is adhered to the upper surface of the first transparent member 31 and that is long in the X-axis direction being disposed between the first transparent member 31 and the second transparent member 32. Although, in the embodiment, the first transparent member 31 and the second transparent member 32 are formed of glass plates that are transparent, whose upper and lower surfaces are smooth, and that include parallel surfaces, the first transparent member 31 and the second transparent member 32 may be formed of transparent synthetic resin.

An image reading surface of an original that is conveyed in the first conveying direction along the reverse conveying path member 18 is faced downward. The original slidably contacts the upper surface of the second transparent member 32 to define the reading position Re (see FIG. 4) of the conveying original for reading the image on the original at the original reading means 8 that is stationary at the lower side of the second transparent member 32. An original holder 34 for causing the original to slidably contact the upper surface of the second transparent member 32 is disposed so as to be urged downward by a spring 34a (see FIGS. 3 and 4).

First Embodiment

In the present invention, a planar surface of the second transparent member 32 is inclined with respect to the horizontally disposed first transparent member 31 so that either one of an upstream side thereof or a downstream side thereof in the original conveying direction is higher.

In a first embodiment shown in FIGS. 3 and 4, the second transparent member 32 is inclined at an inclination angle of θ1 with respect to the horizontally disposed first transparent member 31 so that the upstream side in the conveying direction of the second transparent member 32 is higher than a portion (downstream side) thereof that is close to the first transparent member 31.

In this way, by setting the upstream side in the original conveying direction of the second transparent member 32 at a high position, it is possible to effectively use a vertical gap situated upstream in the conveying direction of the original from the lower end of the reverse conveying path member 18. In addition, when the second transparent member 32 is disposed parallel to a downwardly inclined conveying path portion situated upstream in the conveying direction of the original from the lower end of the reverse conveying path member 18, it is possible to bring the reading position Re closer to the one end side (downstream side in the conveying direction) of the first transparent member 31 by approximately a few millimeters than when the second transparent member 32 is horizontally disposed. As a result, the size of the image reading apparatus 2 in the Y-axis direction can be small, so that the image reading apparatus 2 can be compactly formed.

In the embodiment, the original reading means 8 includes a carriage 35 (an example of a "carriage" according to the present invention), a case 36 (an example of a "case" according to the present invention), and an image reading sensor 37 (an example of an "image reading sensor" according to the present invention). The carriage 35 is placed on the round-shaft-like guide member 13 and its orientation is kept constant. The case 36 is disposed in the carriage 35 having an open top. The image reading sensor 37 is secured in the case 36. In the embodiment, the image reading sensor 37 is a contact image sensor (CIS) having a small depth of focus. The case 36 is vertically movably and rotatably disposed at the carriage 35. More specifically, a pair of support shafts 38 extending in the longitudinal direction (X-axis direction) at respective ends of the case 36 are vertically movably and rotatably fitted to guide grooves 39 formed at respective ends of the carriage 35 (in FIG. 5, the support shaft 38 at one end is shown). By this, the image reading sensor 37 and the case 36 are integrally formed with each other, can rotate around an axis extending in a direction orthogonal to the direction of movement of the carriage 35 and parallel to the lower surfaces of the transparent members 31 and 32, and can move perpendicularly to the lower surfaces of the transparent members 31 and 32.

The case 36 is urged upward by urging means, such as a coil spring 40 (an example of an "urging member" according to the present invention), disposed between the bottom plate of the carriage 35 and the lower surface of the case 36. Both ends of the carriage 35 may be slidably supported at guide members (not shown) extending in the Y-axis direction below portions of the body case 2a supporting the side ends of the first transparent member 31 and the second transparent member 32.

A belt 41, such as a timing belt, connected to the carriage 35 is wound upon a drive pulley 42 and a driven pulley 43, disposed at respective ends in the Y-axis direction in the body case 2a, and is rotated by a driving motor (not shown) (see FIG. 2).

If the image reading sensor 37 is a contact image sensor, since its depth of focus is small, it is necessary to dispose the surface of the image reading sensor 37 close to the lower surfaces of the transparent members 31 and 32 and to keep it here. A pair of a first rotating roller 44 (an example of a "sliding member", a "rotating member" according to the present invention) and a second rotating roller 45 (an example of a "sliding member", a "rotating member" according to the present invention) are disposed at the upper side in the X-axis direction at ends of the case 36 (in FIG. 5, the rollers 44 and 45 are shown at one end portion). The first rotating roller 44 and the second rotating roller 45 are disposed so as to be separated from each other as required in both the X-axis direction and the Y-axis direction (see FIGS. 4 and 5).

When the carriage 35 passes horizontally along the lower surfaces of the adjacent portions of the first transparent member 31 and the second transparent member 32, in order to prevent the upper surface of the upwardly urged image reading sensor 37 from colliding with a lower corner portion at the one end of the lower transparent member, movement guiding means 46 (an example of a "connecting member" according to the present invention) is provided. The movement guiding means 46 is not shown in FIGS. 3 and 4.

Figure 5:
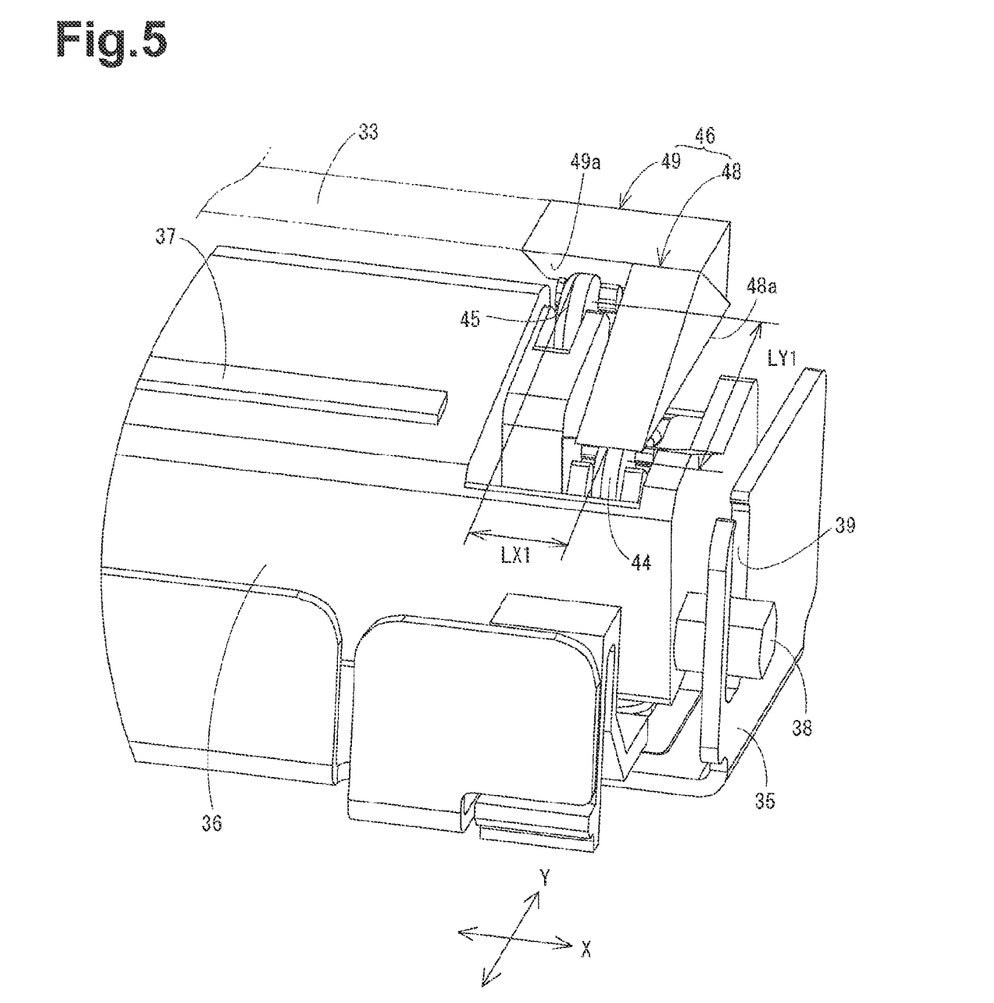
FIG. 5 is an enlarged perspective view of the main portion, showing the relationship between the positions of a pair of rotating rollers, a first guide member, and a second guide member at one side of a case.

FIG. 5 shows a first embodiment of the movement guiding means 46 according to the first embodiment. That is, a pair of guide members 48 and 49 having respective guide inclined surfaces 48a and 49a (an example of a "guiding surface", an "inclined surface" according to the present invention) for guiding the pair of rotating rollers 44 and 45 are provided at a passing portion where the carriage 35 passes in the movement direction the adjacent portions of the one end of the first transparent member 31 and the one end of the second transparent member 32. In this case, since the pair of first rotating roller 44 and second rotating roller 45 are provided at the case 36 at outer portions of ends in the X-axis direction of the image reading sensor 37, the pair of guide members 48 and 49 are also provided at locations corresponding to the locations of the rotating rollers 44 and 45, and are not provided at locations corresponding to the surface (upper surface) of the image reading sensor 37.

The first rotating roller 44 and the second rotating roller 45 are disposed apart from each other by a distance (LX1) in the X-axis direction, and by a distance (LY1) in the Y-axis direction. Therefore, the first guide inclined surface 48a of the first the first guide member 48 corresponding to the first rotating roller 44 and the second guide inclined surface 49a of the second guide member 49 corresponding to the second rotating roller 45 are disposed apart from each other as required in both the X-axis direction and the Y-axis direction (see FIG. 5).

Further, for example, when the carriage 35 moves in a direction in which it passes from the horizontal first transparent member 31 to the upwardly inclined second transparent member 32, in side projection view, the lower surface of the first guide member 48 is formed flush with the lower surface of the first transparent member 31 or is formed with a downwardly facing protruding curved surface, up to an appropriate downstream side at which the location corresponding to a lower-surface-side corner 31a at the one end of the first transparent member 31 is passed. In continuation with this, the first guide inclined surface 48a is formed so as to contact the lower surface of the second transparent member 32. In the same side projection view, from a location corresponding to that of the lower-surface-side corner 31a at the one end of the first transparent member 31 or from a nearest downstream-side position beyond the location of the lower-surface-side corner 31a, the second guide member 49 is linearly formed so that the second guide inclined surface 49a contacts the lower surface of the second transparent member 32. In the first embodiment, the first guide inclined surface 48a and the second guide inclined surface 49a are linearly formed (see FIG. 5).

According to this structure, while the first rotating roller 44 passes beyond the one end portion of the first transparent member 31 and passes along the first guide inclined surface 48a, the second rotating roller 45 slidably contacts the lower surface of the second guide member 49 that is at the same height as the lower surface of the first transparent member 31. Therefore, the carriage 35 can move so that the upper surface of the image reading sensor 37 disposed between both rotating rollers 44 and 45 does not collide with the lower-surface-side corner 31a at the one end of the first transparent member 31. Even if the carriage 35, positioned at the lower-surface side of the second transparent member 32, is moved towards the lower surface of the first transparent member 31, similarly, the upper surface of the image reading sensor 37 does not collide with the lower-surface-side corner 31a at the one end of the horizontal first transparent member 31. As a result, noticeable advantages are achieved in that the reading portion corresponding to the upper surface of the image reading sensor 37 is not scratched, and in that the quality of a reading operation is not deteriorated.

If the carriage 35 is moved until both of the rotating rollers 44 and 45 slidably contact the lower surface of the second transparent member 32, the upper surface of the image reading sensor 37 is located adjacent to and is parallel with the lower surface of the second transparent member 32.

Second Embodiment

Figure 6:
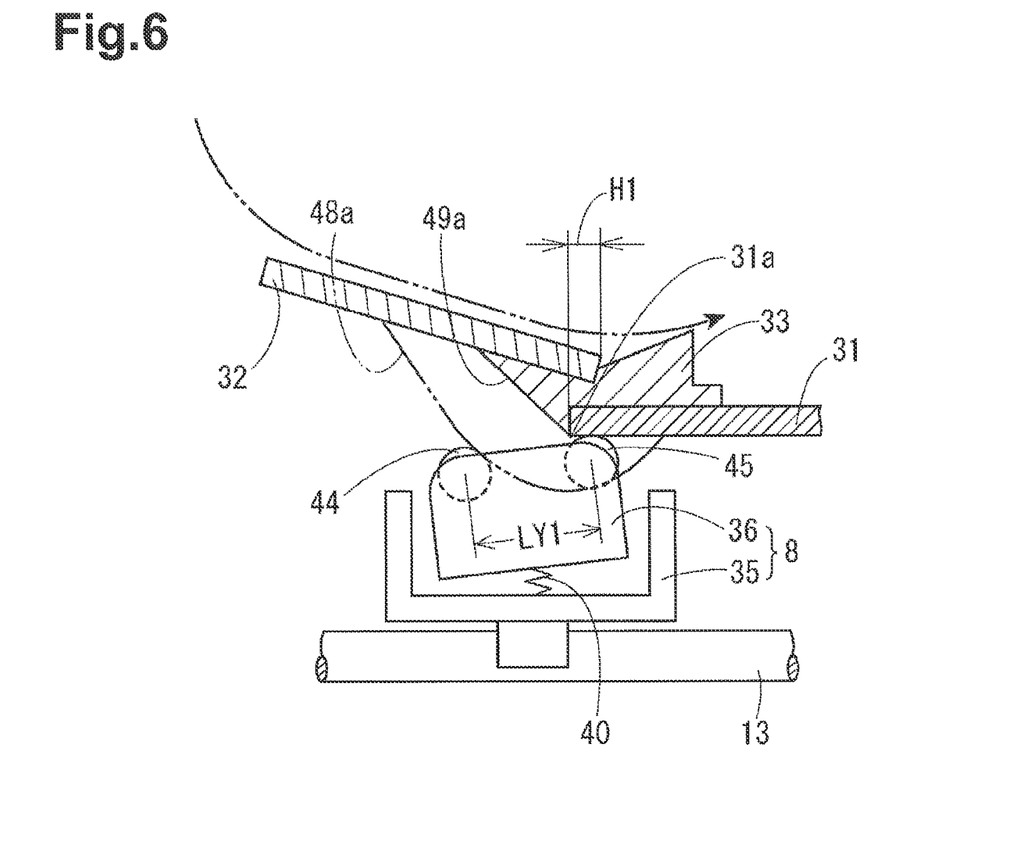
FIG. 6 is an enlarged sectional view of the main portion according to a second embodiment of the present invention.

In a second embodiment shown in FIG. 6, a second transparent member 32 is inclined and disposed with respect to a horizontally disposed first transparent member 31 so that the upstream-side in the conveying direction of the second transparent member 32 is higher than a portion (downstream side) of the second transparent member 32 that is adjacent to the first transparent member 31, and is disposed so that the lower end of the second transparent member 32 overlaps the upper side of one end of the first transparent member 31 by an appropriate dimension H1. In this case, since the second transparent member 32 is disposed with respect to the first transparent member 31 with a take-up guide member 33 being interposed therebetween, the first transparent member 31 and the second transparent member 32 that are at different heights in the thickness direction of both of the transparent members 31 and 32 overlap each other.

The dimension H1 of the overlapping portion is arbitrarily set. As a result of disposing one end portion of each of the transparent members 31 and 32 so that these end portions overlap each other without any gap formed therebetween, flexing of the one end of each of the transparent members 31 and 32 is also reduced. In addition, since dust does not fall towards the lower sides of the transparent members 31 and 32, the reading surface of a image reading means 8 is not stained, and the quality of a reading operation is not deteriorated. By securing an abutting portion of each of the transparent members 31 and 32 to the take-up guide member 33 with an adhesive, the transparent members 31 and 32 are kept more firmly at their positions with greater strength, which is desirable.

In the second embodiment shown in FIG. 6, in side projection view, a first guide inclined surface 48a at the lower side of the first guide member 48 is such that its leading end portion starts from the upstream side in the movement direction of a carriage 35 with respect to the location corresponding to that of a lower-surface-side corner 31a at the one end of the first transparent member 31, and is such that it is similarly formed in a protruding curved shape below the lower surface of the first transparent member 31 up to an appropriate downstream side beyond the location of the lower-surface-side corner 31a at the one end of the first transparent member 31. Further, in continuation with this, in side projection view, the first guide inclined surface 48a is formed so as to contact the lower surface of the second transparent member 32 (see alternate long and two short dash line in FIG. 6). From a location corresponding to that of the lower-surface-side corner 31a at the one end of the first transparent member 31 or from a nearest downstream-side position beyond the location of the lower-surface-side corner 31a, a second guide inclined surface 49a of a second guide member 49 is linearly formed so as to contact the lower surface of the second transparent member 32.

Even in the second embodiment, even if the carriage 35 reciprocates horizontally along the Y-axis direction by passing the lower side of the overlapping portion of the first transparent member 31 and the second transparent member 32, the upper surface of an upwardly urged image reading sensor 37 does not collide with the lower-surface-side corner 31a at the one end of the lower first transparent member 31.

Third Embodiment

In a third embodiment shown in FIGS. 7A to 7D, a second transparent member 32 is inclined and disposed with respect to a horizontally disposed first transparent member 31 so that the upstream-side in the conveying direction of the second transparent member 32 is lower than a portion (downstream side) of the second transparent member 32 that is adjacent to the first transparent member 31. In this case, the second transparent member 32 is disposed with respect to the first transparent member 31 with a take-up guide member 33 being interposed therebetween.

In the third embodiment, in order to guide an original, which passes along the second transparent member 32 and which is conveyed downstream, to a sheet-discharge-section side of an automatic document feeder 3, the take-up guide member 33 has an upwardly inclined surface from an abutting portion of the downstream-side end of the second transparent member 32. Therefore, if the second transparent member 32 is inclined and disposed so that the downstream-side end is situated at a high position, the height of the take-up guide member 33 itself can be small.

In projection plan view, until a first guide inclined surface 48a (formed in correspondence with the lower surface of a first guide member 48) that extends beyond a location corresponding to that of a lower-surface-side corner 31a at one end of the first transparent member 31 reaches the lower surface of the second transparent member 32, the first guide inclined surface 48a is formed flush with the lower surface of the first transparent member 31. Similarly, in side projection view, from a location corresponding to that of the lower-surface-side 31a at the one end of the first transparent member 31 or from a nearest downstream-side position beyond the location corresponding to that of the lower-surface-side corner 31a, a second guide inclined surface 49a of a second guide member 49 is linearly formed so as to contact the lower surface of the second transparent member 32. In the third embodiment, the first guide inclined surface 48a and the second guide inclined surface 49a are linearly formed (see FIG. 7A).

By virtue of such a structure, for example, when the carriage 35 moves in a direction in which it passes from the horizontal first transparent member 31 side to the downwardly inclined second transparent member 32, while, a first rotating roller 44 passes beyond the one end portion of the first transparent member 31, and passes along the lower surface of the second transparent member 32 (which is flush with the lower surface of the first transparent member 31) and the first guide inclined surface 48a that follows the second transparent member 32, a second rotating roller 45 slidably contacts the lower surface of the second guide member 49 (which is at the same height as the lower surface of the first transparent member 31). Therefore, the carriage 35 can move so that the upper surface of an image reading sensor 37 disposed between both rotating rollers 44 and 45 does not collide with the lower-surface-side corner 31a at the one end of the first transparent member 31 (see FIG. 7B). As a result, noticeable advantages are achieved in that the reading portion corresponding to the upper surface of the image reading sensor 37 is not scratched, and in that the quality of a reading operation is not deteriorated.

Figure 7A:
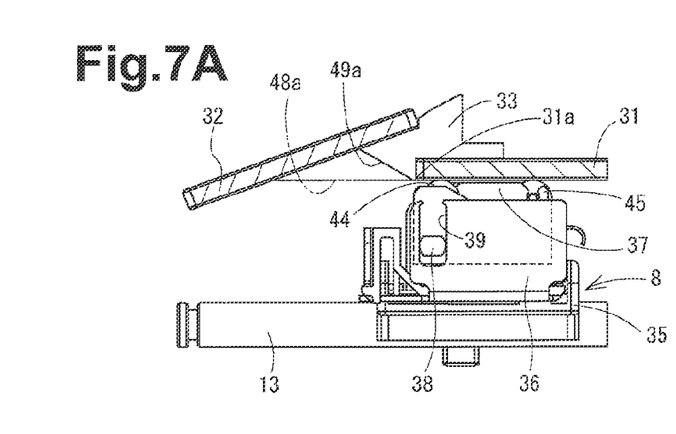
Figure 7B:
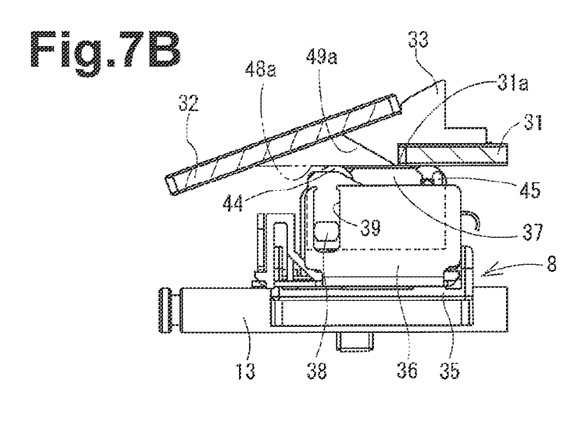
FIGS. 7B and 7C each is a side view of a state in which the image reading sensor is positioned at the first transparent member, a second transparent member, and a passing portion.
Figure 7C:
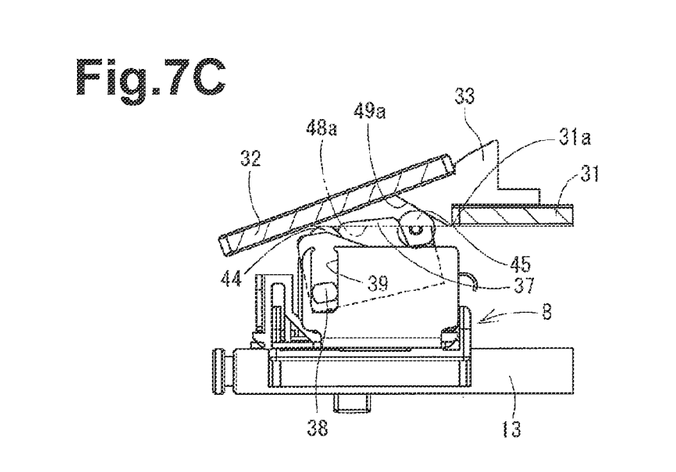

Next, if, while the first rotating roller 44 passes along the first guide inclined surface 48a, the following second rotating roller 45 moves to the second guide inclined surface 49a of the second guide member 49, in side projection view, the upper surface of the image reading sensor 37 disposed between both of the rotating rollers 44 and 45 is also inclined below the second transparent member 32 (see FIG. 7C).

Figure 7D:
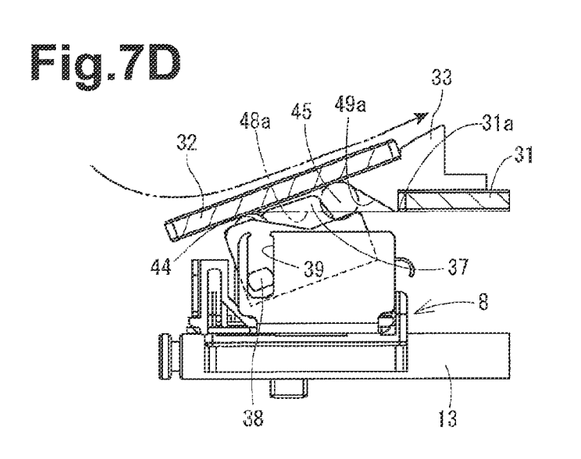
FIG. 7D is a side view of a state in which the image reading sensor has passed to the second transparent member.

Further, if the carriage 35 moves and both of the rotating rollers 44 and 45 are positioned at the lower side of the second transparent member 32, the upper surface of the image reading sensor 37 is disposed adjacent to the lower surface of the second transparent member 32 and parallel thereto (see FIG. 7D). Therefore, an image of an original passing along the upper surface of the second transparent member 32 can be precisely read.

Even if the carriage 35, positioned at the lower-surface side of the second transparent member 32, is moved horizontally towards the lower surface of the first transparent member 31, in the order that is the reverse of that mentioned above, the orientation of the image reading sensor 37 varies. Therefore, the upper surface of the image reading sensor 37 does not collide with the upper-surface-side corner 31a at the one end of the first transparent member 31 at the lower position. Consequently, noticeable advantages are provided in that the image reading section corresponding to the upper surface of the image reading sensor 37 is not scratched and that quality of a reading operation is not deteriorated.

Fourth Embodiment

Figure 8:
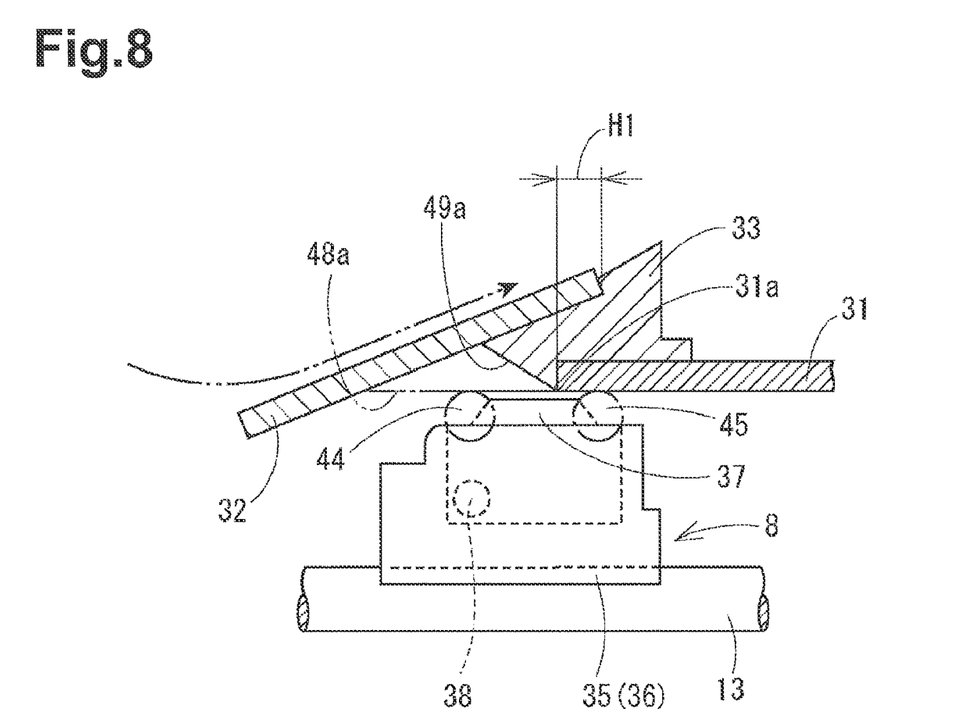
FIG. 8 shows an inclined overlapping portion of a first transparent member and a second transparent member and a side of a first inclined guide surface and a second inclined guide surface according to a fourth embodiment of the present invention.

In a fourth embodiment shown in FIG. 8, one end (downstream-side end) of a second transparent member 32 inclined and disposed so that its upstream side in the conveying direction is at a low position and its downstream side in the conveying direction is at a high position is disposed above one end of the first transparent member 31 so that one end of the second transparent member 32 and the one end of the first transparent member 31 at different heights in the thickness direction of both of the transparent members 31 and 32 overlap each other by a dimension H1. Even in this case, the second transparent member 32 is disposed with respect to the first transparent member 31 so that a take-up guide member 33 is interposed between the first transparent member 31 and the second transparent member 32. Since the structures of a first guide inclined surface 48a of a first guide member 48 and a second guide inclined surface 49a of a second guide member 49 and the operations thereof are the same as those of the third embodiment, the same reference numerals will be given to corresponding parts and details thereof will not be given.

When the second transparent member 32 inclined so that its downstream side in the conveying direction is set high overlaps the upper surface of the first transparent member 31 from above the first transparent member 31, at the conveyance reading section, the inclination angle of the upwardly oriented inclined surface of the take-up guide member 33 for guiding an original to the discharge path member 22 can be made smaller than that when the first transparent member 31 and the second transparent member 32 are flush with each other or when the second transparent member 32 is one that is inclined so that its downstream side in the conveying direction is low. As a result, upward pulling of an original passing a reading section Re is reduced, thereby preventing the original from becoming raised from the upper surface of the second transparent member 32, so that the quality of a reading operation is ensured.

When, regardless of the existence/non-existence of an overlapping portion, the second transparent member 32 is inclined so that its downstream side in the conveying direction is set high, the distance through which the second guide inclined surface 49a of the second guide member 49 extends from the lower-surface-side corner 31a at the one end of the first transparent member 31 to the lower surface of the second transparent member 32 is shorter than that when the second transparent member 32 is inclined so that its downstream side in the conveying direction is set low, and the distance (passing distance) to where the upper surface of the image reading sensor 37 becomes parallel with the lower surface of the second transparent member 32 is reduced. As a result, it is possible to set the reading section Re of a conveying original at the second transparent member 32 close to the one end of the first conveying member 31, so that the size of the image reading apparatus 2 in the Y-axis direction can be reduced.

Figure 9:
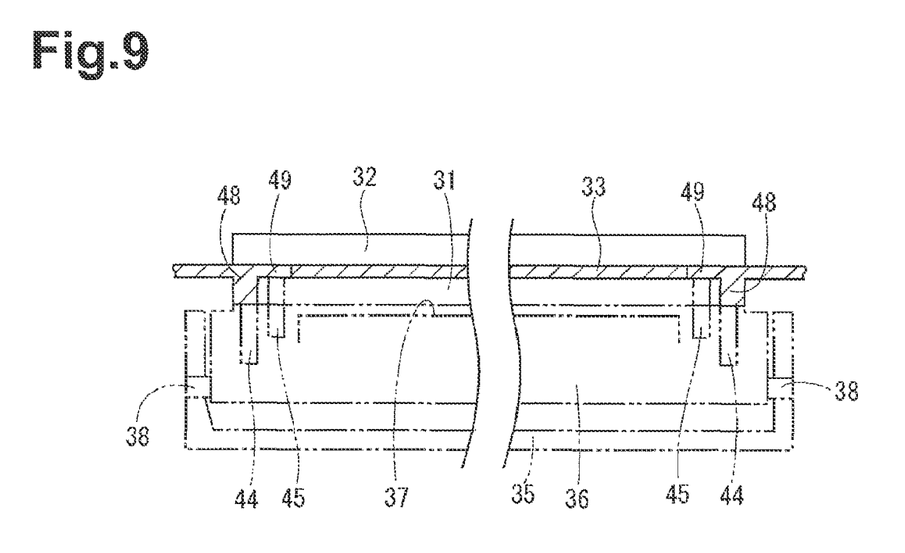
FIG. 9 is a schematic sectional view showing the relationship between the positions of a pair of rotating rollers, a first guide member, and a second guide member.

A plurality of the first guide members 48 and the second guide members 49 may be formed adjacent to respective ends in the X-axis direction of the take-up guide member 33, and integral with the take-up guide member 33 (see FIG. 9). In another embodiment, a first guide member 48 and a second guide member 49 can be formed integrally with lower-surface sides of support portions at side edges of a first transparent member 31 and a second transparent member 32 at the upper plate side of a body case 2a. Alternatively, the first guide member 48 and the second guide member 49 that are separate members may be secured to the lower-surface sides of the upper plate of the body case 2a with, for example, an adhesive.

Instead of the rotating rollers 44 and 45, a pair of sliding members may be formed by members in which portions thereof that do not rotate and that include protruding curved surfaces have small friction coefficients.

Another Embodiment

Figure 10A:
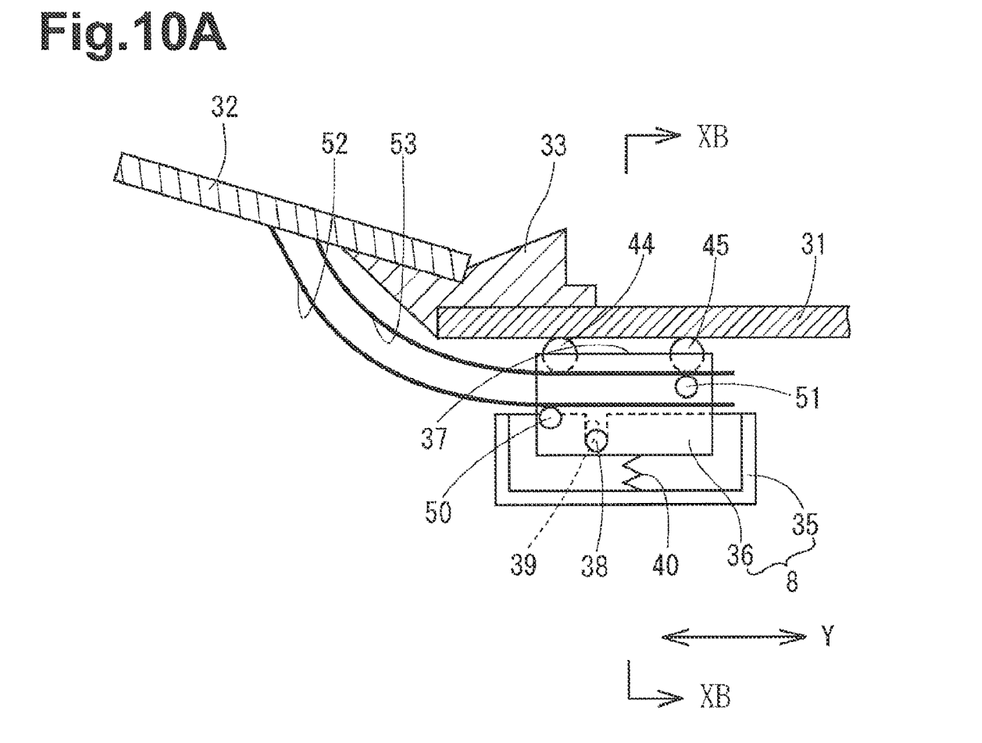
FIG. 10A is a side sectional view of guide members according to another embodiment of the present invention.
Figure 10B:
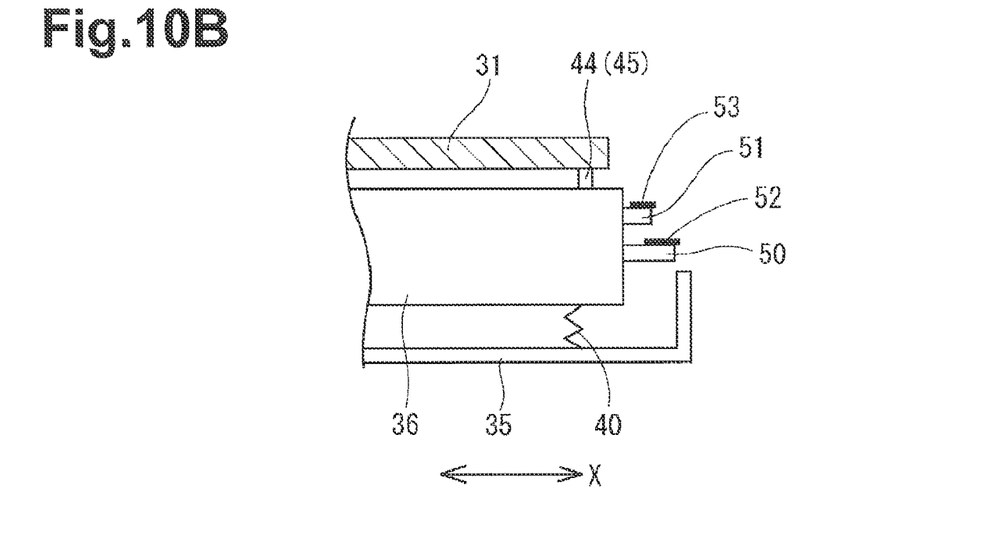
FIG. 10B is a sectional view taken along line XB-XB of FIG. 10A.

FIGS. 10A and 10B show guide members according to another embodiment for preventing the upper surface of an image reading sensor 37 to collide with a lower-surface side corner 31a at one end of a first transparent member 31 disposed at the lower position when original reading means 8 passes between the one end of the first transparent member 31 and one end of a second transparent member 32.

In this embodiment, a case 36 that accommodates the image reading sensor 37 is urged upward by a coil spring 40 with respect to a carriage 35 that moves horizontally at the same height. The image reading sensor 37 and the case 36 are integrally formed through support shafts 38 and guide grooves 39, are rotatable around an axis orthogonal to the direction of movement of the carriage 35 and parallel to the lower surfaces of both of the transparent members 31 and 32, and are movable perpendicularly to the lower surfaces of both of the transparent members 31 and 32.

A pair of a first sliding shaft 50 and a second sliding shaft 51, which have round-shaft forms, are disposed at the upper surfaces of ends of the X-axis direction of the case 36 (in FIG. 10, they are shown at one end). The first sliding shaft 50 and the second sliding shaft 51 are disposed apart from each other as required in both the X-axis direction and the Y-axis direction (see FIGS. 10A and 10B).

A first guide rail 52 and a second guide rail 53 are disposed at a passing portion at the one end of the first transparent member 31 and the one end of the second transparent member 32. In addition, in side projection view, both of the guide rails 52 and 53 are formed in projecting curved shapes at the passing portion. Therefore, when the first sliding shaft 50 moves along the first guide rail 52, and the second sliding shaft 51 moves along the second sliding shaft 53, the upper surface of the image reading sensor 37 that is urged upward by the coil spring 40 does not collide with the low-surface-side corner 31a at the one end of the first transparent member 31. The pair of rollers 44 and 45 in this case keep constant a gap between the upper surface of the image reading sensor 37 when it moves and the lower surfaces of both of the transparent members 31 and 32.

In the embodiments, in order to urge the case 36 upward, an urging member is used, but a plurality of urging members may be used. Moreover, the urging member may not be used and a guide of the carriage 35 may be set in parallel with the first transparent member 31 and the second transparent member 32.

What is claimed is:

1. An image reading apparatus comprising:
    an image reading portion configured to move in a predetermined direction, the image reading portion comprising an image reading sensor configured to read an image on a sheet;
    a sheet feeder configured to feed the sheet;
    a first transparent member having a reference surface configured to support the sheet thereon; and
    a second transparent member configured to contact the sheet fed by the sheet feeder,
    wherein the second transparent member is positioned in an inclined position with respect to the reference surface of the first transparent member,
    wherein the image reading portion is configured to move along a lower surface of the first transparent member and to move along a lower surface of the second transparent member, and
    wherein the image reading portion is configured to incline in response to a movement between a first position for reading the image through the first transparent member and a second position for reading the image through the second transparent member.

2. The image reading apparatus according to claim 1, wherein the second transparent member comprises a first end and a second end positioned closer to the first transparent member than the first end in the predetermined direction, and the first end is positioned further from the reference surface than the second end in a direction perpendicular to the reference surface.

3. The image reading apparatus according to claim 1, wherein the image reading sensor is a contact image sensor.

4. The image reading apparatus according to claim 1, further comprising a case of the image reading portion, and wherein the image reading portion comprises a carriage configured to support the case, the carriage extends in a direction perpendicular to the predetermined direction, and the carriage is configured to reciprocate in the predetermined direction and a direction opposite to the predetermined direction.

5. The image reading apparatus according to claim 4, wherein the image reading portion further comprises an urging member positioned between the carriage and the case and configured to urge the case in a direction away from a bottom surface of the carriage.

6. The image reading apparatus according to claim 1, wherein a portion of the first transparent member overlaps a portion of the second transparent member in a direction perpendicular to the reference surface.

7. An image reading apparatus according to claim 1, comprising:
    an image reading portion configured to move in a predetermined direction, the image reading portion comprising an image reading sensor configured to read an image on a sheet;
    a sheet feeder configured to feed the sheet;
    a first transparent member having a reference surface configured to support the sheet thereon; and
    a second transparent member configured to contact the sheet fed by the sheet feeder,
    wherein the second transparent member is positioned in an inclined position with respect to the reference surface of the first transparent member,
    wherein the image reading portion is configured to move along a lower surface of the first transparent member and to move along a lower surface of the second transparent member, and
    wherein the image reading portion is configured to slide along and contact the lower surface of the first transparent member and the lower surface of the second transparent member.

8. An image reading apparatus comprising;
    an image reading portion configured to move in a predetermined direction, the image reading portion comprising an image reading sensor configured to read an image on a sheet;
    a sheet feeder configured to feed the sheet;
    a first transparent member having a reference surface configured to support the sheet thereon;
    a second transparent member configured to contact the sheet fed by the sheet feeder; and
    a connecting member configured to connect the first transparent member to the second transparent member,
    wherein the second transparent member is positioned in an inclined position with respect to the reference surface of the first transparent member,
    wherein the image reading portion is configured to move along a lower surface of the first transparent member and to move along a lower surface of the second transparent member, and
    wherein the image reading portion is configured to selectively move between the lower surface of the first transparent member and the lower surface of the second transparent member via the connecting member.

9. The image reading apparatus according to claim 8, wherein
    the image reading portion further comprises at least one sliding portion; and
    the connecting member comprises a guiding surface configured to guide the at least one sliding portion.

10. The image reading apparatus according to claim 9, wherein
    the at least one sliding portion comprises a first sliding member and a second sliding member, the first sliding member is separated from the second sliding member by a predetermined interval in the predetermined direction; and the guiding surface comprises a pair of inclined surfaces, each of the pair of the inclined surfaces guides one of the first and the second sliding members.

11. The image reading apparatus according to claim 9, wherein the guiding surface comprises a downwardly protruding curved surface.

12. The image reading apparatus according to claim 9, wherein the guiding surface extends along the lower surface of the first transparent member.

13. The image reading apparatus according to claim 9, wherein the sliding portion comprises at least one rotating member.

14. The image reading apparatus according to claim 9, wherein the sliding portion comprises a protruding portion having a substantially low friction coefficient.

* * * * *